Jan. 28, 1964    F. M. RONCI    3,119,192
REINFORCED HEEL AND MOLDED PLASTIC TAP
Filed May 21, 1962
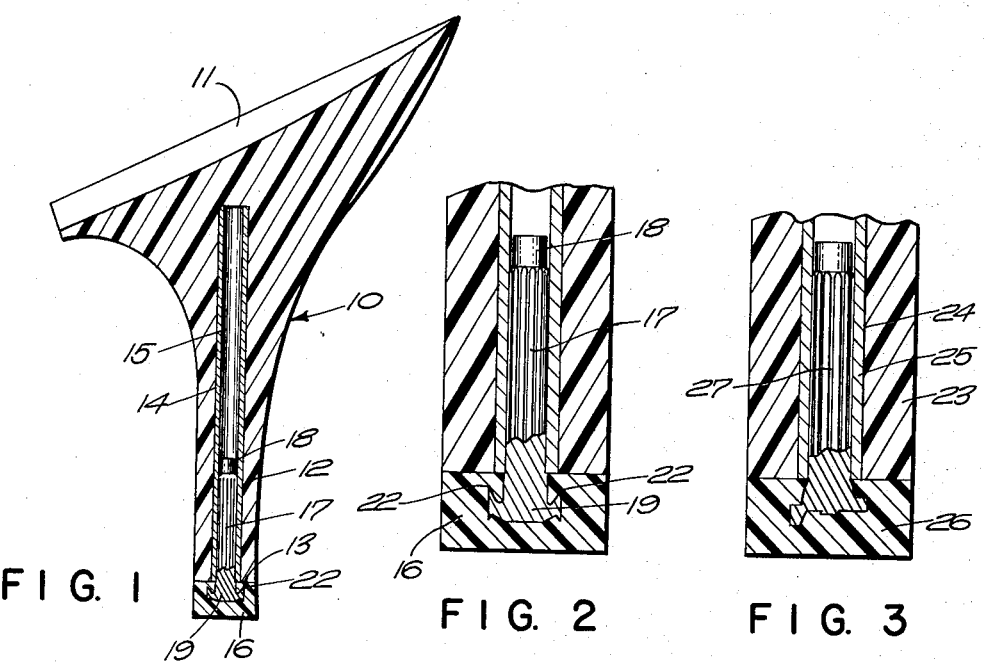
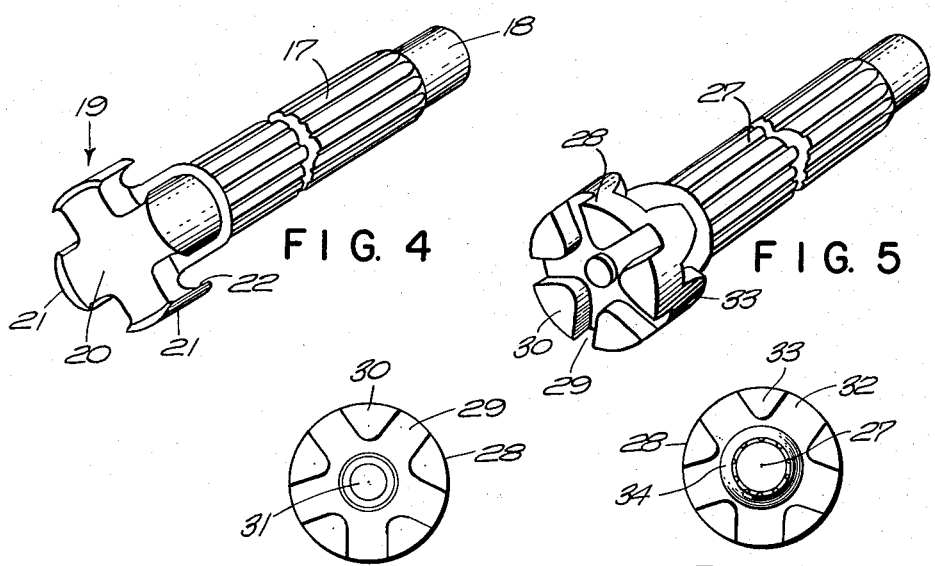
INVENTOR.
FERNANDO M. RONCI
BY
ATTORNEY

United States Patent Office 3,119,192
Patented Jan. 28, 1964

3,119,192
REINFORCED HEEL AND MOLDED PLASTIC TAP
Fernando M. Ronci, Providence, R.I.
(2 Atlantic Blvd., Centredale, R.I.)
Filed May 21, 1962, Ser. No. 196,198
1 Claim. (Cl. 36—34)

The present invention relates to the shoe making art and more particularly to a novel construction of a reinforced plastic heel and a replaceable tap therefor.

The principal object of the present invention is to provide a replaceable plastic tap for a reinforced plastic heel, the plastic tap being molded to the reinforcing core.

Another object of the present invention is to provide a plastic tap having a novel mounting and anchoring means.

A further object of the present invention is to provide a replaceable plastic tap which has a firm gripping action for retaining the molded tap on the reinforcing core.

The present invention constitutes an improvement over my Patent No. 2,935,800, issued May 10, 1960, and entitled Reinforcerd Plastic Heel and Removable Tap, and also my copending application Serial No. 53,244, filed August 31, 1960, now Patent No. 3,055,125, and entitled Reinforced Heel and Replaceable Plastic Tap.

With the above and other objects and advantageous features in view my invention consists of a novel arrangement of parts more fully disclosed in the detailed description following in conjunction with the accompanying drawings and more particularly defined in the appended claim.

In the drawings,

FIG. 1 is a vertical section of a plastic heel and a tap embodying my invention.

FIG. 2 is an enlarged section of the lower portion of the heel showing the tap mounting.

FIG. 3 is a view similar to FIG. 2 showing another form of my invention.

FIG. 4 is an enlarged perspective view of the tap holding and mounting means illustrated in FIGS. 1 and 2.

FIG. 5 is a view similar to FIG. 4 showing the tap holding means illustrated in FIG. 3.

FIG. 6 is a bottom plan view of the tap holding means shown in FIG. 5.

FIG. 7 is a top plan view of the tap holding means shown in FIG. 5.

Women's shoes are usually provided with extremely thin plastic heels. These are now reinforced in various ways, either by the application of a hollow tube as shown in the patent hereinabove referred to or by the use of reinforcing cores extending therethrough. In either event, the plastic tap must be molded to the head of a reinforcing core. However, the strain of walking on such a small tap causes distortion and tends to snap the tap from the reinforcing core. In my copending application hereinabove referred to I have shown one method of gripping the plastic tap so that it will not separate from the reinforcing core. This gripping method is an independent spider member which is mounted on the reinforcing core. The present application is an improvement on this in that no independent means is provided but the head of the reinforcing core is so constructed that it will intermesh with the molded plastic and prevent separation in actual use.

Referring more in detail to the drawings, FIG. 1 shows a modern type of plastic heel 10 having a broad top portion 11 tapering to a very narrow elongated portion 12 terminating in the tread end 13. The heel 10 is preferably molded of plastic material and is provided with a vertical opening 14 extending from the tread end 13 upwardly through the narrow portion 12 and into the broad top portion 11. If desired, the opening 14 may be extended upwardly completely through the heel. Reinforcement of the heel is provided by a tube 15 made of tempered steel. The tube 15 can be hardened to a greater degree than a solid reinforcing core. As set forth in my patent above referred to, the tube 15 may be provided with a split seam (not shown). It is contemplated that the tube 15 have an outside diameter slightly greater than that of the opening 14 in the heel. Thus the tube 15 may be forced into the opening 14 until its lower end is flush with the tread end 13 of the heel. The tube is thus frictionally and tightly held in place and provides the necessary strength for the narrow portion of the heel 10. In the illustrated forms the sole means of strengthening the heel 10 has been the tube 15. Thus the tap is mounted on a core as illustrated in FIGS. 2 and 3 which is used to fit into the tube 15 and hold the tap in place. However, the cores illustrated may be themselves elongated to form reinforcement for the heel and if desired, the tube 15 can be dispensed with in such cases and the cores constitute the entire reinforcement for the heel as well as the means for holding the tap.

Now referring to FIGS. 1, 2, and 4, a plastic tap 16 is removably and replaceably held at the tread end of the heel by the construction shown therein. The tap holding and mounting means comprises a solid annular metal shank 17 having longitudinal flutes or other roughened portions on its outer surface. The upper end of the shank 17 is provided with a smooth narrow portion 18 which acts as a locater for the thrust end. The diameter of the shank 17 is equal to or slightly greater than the inside diameter of the tube 15 to provide an extremely tight frictional fit. In cases where the tube 15 is eliminated, the diameter of the shank 17 is equal to or slightly greater than the opening 14. The shank 17 is provided at its bottom end with an enlarged head 19 designed to intermesh with the tap 16 as illustrated. It should be remembered that the diameter of the tap 16 is extremely small, in the neighborhood of one-half inch or less. It is therefore essential that there be a complete intermeshing of the parts both in a horizontal and in a vertical plane. In the form illustrated in FIGS. 1, 2 and 4, the head 19 is in the form of a cross 20 and having arcuate plate like integral portions 21 at the ends of the cross portion 20. The plate portions 21 depend at 22 from the cross portion 20 to form an undercut between the shank 17 and the portion 22. This is illustrated in FIGS. 1 and 2 which shows the molded material of the tap 16 entering this area between the tip of the portions 22 and the shank 17. This construction serves to firmly anchor the head of the shank 17 in the plastic material of the tap 16 so that the parts will not separate in use nor will the tap 16 rotate on the head. This rotation is stopped cruciform shape of the head 20. The plastic material of the tap, which is annular, therefore not only covers the exposed parts but enters between the corners of the cruciform head 20 and beneath the undercut portion formed by the end 22 of the portions 21 and the shank 17.

The form illustrated in FIGS. 1, 2 and 4 is particularly designed for a heavy construction in which the shank 17 is long enough to be used as a reinforcing core and possibly even longer to replace the tube 15 as a reinforcement for the plastic heel tap. Where the tap is extremely small and the shank is to be used for holding it in a tube 15, the construction shown in FIGS. 3 to 7 inclusive may be used. In this form the heel 23 is provided with an opening 24 and tube 25 similar to the construction shown in FIG. 1. The tap 26 is molded to the head of a fluted shank 27. In this case, both the top and bottom edges of the head 28 are designed to interlock with the molded plastic material. The head 28 is annular. Viewing FIGS. 5 and 6, the bottom portion is provided with five surface channels 29 leaving triangular high plateaus 30 in between. The center is provided with a small raised portion 31. This permits the plastic material to fill all the channels 29 and to intermesh with the raised points 30 to prevent any rotation of the tap 26 with respect to the shank 27 when the parts are molded together as shown in FIG. 3. The opposite side of the head 28, is similarly provided with a plurality of channels 32 leaving triangular raised portions 33 therebetween. However, at the top the raised portions 33 are much higher than the portions 30 as can be seen in FIG. 5 forming a much deeper cut, and a wide shoulder portion extends from the shank tapering outwardly at 34 to strengthen the disc portion 28. The construction thus provides a complete interlocking and intermeshing with the plastic material both above and below the annular disc 28 to prevent rotation and to prevent separation of the tap 26 from the shank 27.

Whether the shanks 17 or 27 are to be used as shown in FIG. 1 or as an elongated reinforcing core for the plastic heels 10 or 23, it is contemplated that they be made of hardened steel and that the tap be composed of a suitable tough yieldable plastic material. The term "plastic" as used in the specification and claim herein therefore includes any of these materials including nylon, polyurethane, acrylonitrile, butadiene, styrene, or any of the other suitable synthetic resins. The above description also states that the tap material is molded to the head of the shank. The word "molded" includes injection molding, compression molding, or casting.

The present invention thus provides a novel interlocking grip between a plastic tap and a reinforcing core for a replaceable plastic heel. Other advantages of the present invention will be readily apparent to a person skilled in the art.

I claim:

A replaceable tap for a narrow plastic heel having an opening extending from the tread end upwardly into the heel, comprising a shank, a plastic tap molded to one end of said shank, and means integral with said shank and cooperating with said plastic tap for locking said tap to said shank and for preventing relative rotation between said tap and said shank, said means including an enlarged, flat, solid, annular head on said shank, said head having projecting portions on the top and bottom separated by channels and intermeshing with said tap to lock said tap to said shank, said tap being retained on said heel when said shank is driven into said opening, the projecting portions on the top being higher than the projecting portions on the bottom and forming an undercut at the top of said head.

References Cited in the file of this patent

UNITED STATES PATENTS

| | | |
|---|---|---|
| 3,040,452 | Whitted | June 26, 1962 |
| 3,041,744 | Brauner | July 3, 1962 |

FOREIGN PATENTS

| | | |
|---|---|---|
| 853,118 | Great Britain | Nov. 2, 1960 |
| 879,761 | Great Britain | Oct. 11, 1961 |
| 1,238,402 | France | July 4, 1960 |